United States Patent
Yeoh et al.

(10) Patent No.: US 7,358,481 B2
(45) Date of Patent: Apr. 15, 2008

(54) REFLECTIVE ENCODER WITH THREE-DIMENSIONAL CODE CARRIER

(75) Inventors: Theng Hooi Yeoh, Penang (MY); Hock Aun Tan, Gurun Kedah (MY); Chee Foo Lum, Penang (MY)

(73) Assignee: Avago General IP Pte Ltd, Singapore (SG)

( * ) Notice: Subject to any disclaimer, the term of this patent is extended or adjusted under 35 U.S.C. 154(b) by 0 days.

(21) Appl. No.: 11/369,287

(22) Filed: Mar. 6, 2006

(65) Prior Publication Data

US 2007/0215799 A1 Sep. 20, 2007

(51) Int. Cl.
*G01D 5/34* (2006.01)
*G01B 11/14* (2006.01)

(52) U.S. Cl. .......................... 250/231.13; 250/231.16; 356/616

(58) Field of Classification Search ................ 250/231.13–231.18, 237 G; 341/11, 13; 356/614–622; 345/165
See application file for complete search history.

(56) References Cited

U.S. PATENT DOCUMENTS

| | | | | |
|---|---|---|---|---|
| 4,806,751 A | * | 2/1989 | Abe et al. ................... | 359/235 |
| 6,232,593 B1 | * | 5/2001 | Taniguchi et al. ...... | 250/231.13 |
| 6,639,206 B1 | * | 10/2003 | Rothamel et al. ....... | 250/231.13 |
| 7,089,672 B2 | * | 8/2006 | Noltemeyer ................ | 33/1 PT |

\* cited by examiner

*Primary Examiner*—Que Tan Le
*Assistant Examiner*—Pascal M Bui-Pho (57) ABSTRACT

An encoder having a code pattern on a carrier and an emitter detector module is disclosed. The code pattern includes alternating reflective and opaque regions on a carrier that includes a planar surface. The emitter-detector module includes a light source that generates light and directs a portion of the generated light at the first side of the carrier and a first detector that detects light reflected from one of the reflective regions. The reflective regions include a three-dimensional element for directing light from the light source onto the first detector. The element has a surface that is inclined at an oblique angle with respect to the planar surface. The code pattern moves with respect to the emitter-detector module. The three-dimensional element can include a reflective imaging element that images the light source onto a surface of the first detector.

5 Claims, 6 Drawing Sheets

REFLECTIVE ENCODER WITH THREE-DIMENSIONAL CODE CARRIER

BACKGROUND OF THE INVENTION

Encoders provide a measurement of the position of a component in a system relative to some predetermined reference point. Encoders are typically used to provide a closed-loop feedback system to a motor or other actuator. For example, a shaft encoder outputs a digital signal that indicates the position of the rotating shaft relative to some known reference position that is not moving. A linear encoder measures the distance between the present position of a moveable carriage and a reference position that is fixed with respect to the moveable carriage as the moveable carriage moves along a predetermined path.

Optical encoders utilize a light source and a photo detector to measure changes in the position of an encoding disk or strip. In a transmissive encoder, the encoding disk includes a series of alternating opaque and transparent stripes. The light source is located on one side of the code strip, and the photodetector is located on the other side of the code strip. The light source and photodetector are fixed relative to one another, and the code strip moves between the light source and the photodetector such that the light reaching the photodetector is interrupted by the opaque regions of the code strip. The position of the code strip is determined by measuring the transitions between the light and dark regions observed by the photodiode.

In a reflective encoder, the light source and photodetector are located on the same side of the code strip, and the code strip consists of alternating reflective and absorbing stripes or bands. The light source and the associated optical system are positioned such that light from the light source is imaged into the detector when the light is reflected from the reflective strips.

Transmissive encoders have a number of advantages over reflective encoders in terms of tolerance and contrast ratios. In a reflective encoder, the distance between the code strip and the detector is critical as either the code strip itself or the light source as seen in the reflected light from the code strip is imaged onto the detector. Hence, if there is an error in the code strip to detector distance, the image will be out of focus and errors will result.

In a transmissive encoder, the light from the light source is colliminated before it reaches the code strip, and hence, the light leaving the code strip is also colliminated. The detection assembly needs only to image this colliminated light onto the detector surface. Hence, the only critical distance is the distance from the imaging lens to the detector, which can be tightly controlled by the detector manufacturer independent of the specific encoder assembly.

In addition, the code strips for reflective encoders have a contrast ratio determined by the ratio of the reflectance of the reflective and absorptive regions. This ratio tends to be less than the ratio of the absorbance of the clear and opaque regions of a transmissive code strip.

Unfortunately, transmissive recorders require that two separate components, the light source and the photodetector, be mounted and aligned with one another at the time of assembly of the encoder. Reflective encoders, in contrast, are constructed from a single emitter-detector element that is packaged together with the various optical components for imaging the light source onto the photodetector. This reduces the cost of assembly.

While reflective encoders provide advantages in terms of requiring only a single emitter detector module, a different emitter detector module is often required when the size or resolution of the code strip is altered. Hence, a number of different emitter detector modules must be stocked to provide emitter detector modules for the various possible code strip designs.

SUMMARY OF THE INVENTION

The present invention includes an encoder having a code pattern on a carrier and an emitter detector module. The code pattern includes alternating reflective and opaque regions on a carrier that includes a planar surface. The emitter-detector module includes a light source that generates light and directs a portion of the generated light at the first side of the carrier and a first detector that detects light reflected from one of the reflective regions. The reflective regions include a three-dimensional element for directing light from the light source onto the first detector. The element has a surface that is inclined at an oblique angle with respect to the planar surface. The code pattern moves with respect to the emitter-detector module. The three-dimensional element can include a reflective imaging element that images the light source onto a surface of the first detector. The opaque regions can include a planar surface that absorbs light, a hole through the carrier, or another reflective element that directs light to a second detector that is displaced from the first detector.

DETAILED DESCRIPTION OF THE PREFERRED EMBODIMENTS OF THE INVENTION

Figures 1, 2, 3:
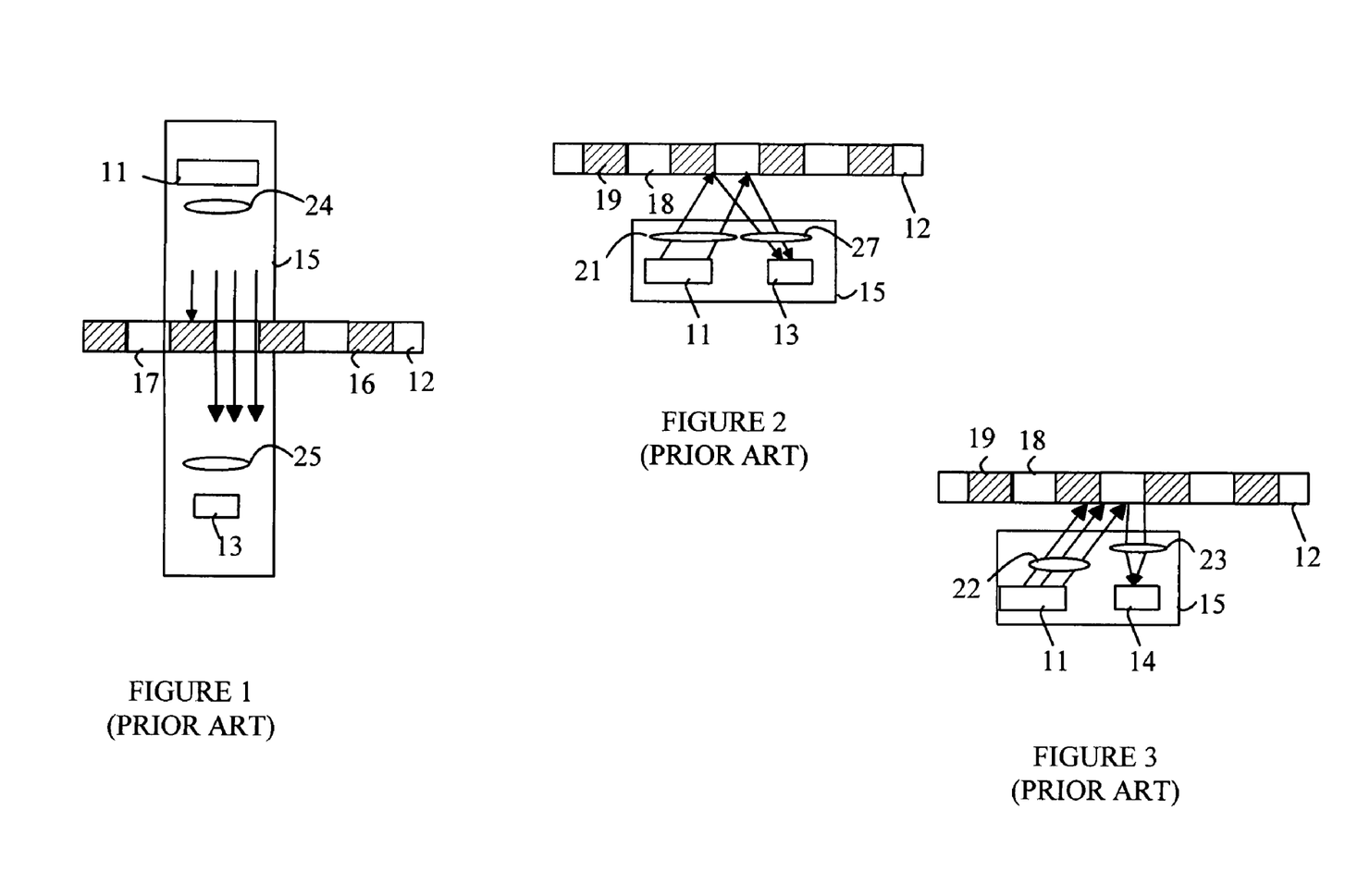
FIG. 1 illustrates a transmissive encoder.
FIG. 2 illustrates one type of reflective encoder.
FIG. 3 illustrates another form of imaging encoder.

Refer now to FIGS. 1-3, which illustrate some typical encoder designs. The encoder can be divided into an emitter/detector module 15 and a code wheel or code strip. Module 15 includes an emitter 11 that illuminates a portion of the code strip 12. The illuminated code strip is viewed by detector 13. The emitter typically utilizes an LED as the light source. The detector is typically based on one or more photodiodes. FIG. 1 illustrates a transmissive encoder. In transmissive encoders, the light from the emitter is colliminated into a parallel beam by a collimating optic such as lens 24. Code strip 12 includes opaque stripes 16 and transparent stripes 17. When code strip 12 moves between emitter 11 and detector 13, the light beam is interrupted by the opaque stripes on the code strip. The photodiodes in the detector receive flashes of light. The resultant signal is then used to generate a logic signal that transitions between logical one and logical zero.

The detector can include an imaging lens 25 that images the collimated light onto the photodiode. Lens 25 can be used to adjust the size of the light stripes to match the size of the photodiode or photodiodes in the detector. When used in this manner, the photodetector is placed at a point between the code strip and the focal point of lens 25. The distance between the photodetector and the lens determines the size of the code strip image on the photodetector.

In general, a transmissive encoder is constructed from two separate sub-modules that are provided to the manufacturer of the encoder. The first sub-module includes the light source consisting of emitter 11 and lens 24. The second sub-module consists of photodetector 13 and lens 25. Since the light is collimated, the only critical distances are those between emitter 11 and lens 24 and between lens 25 and photodetector 13. These distances can be controlled to a high level of precision by the sub-module manufacturer. Hence, the tolerances that need to be maintained by the encoder manufacturer are substantially reduced in transmissive designs. However, transmissive encoders are more expensive from the point of view of the entity assembling the encoder, since two sub-modules must be mounted and aligned.

FIG. 2 illustrates one type of reflective encoder. In reflective encoders, the code strip includes reflective stripes 18 and absorptive stripes 19. The emitter includes an optical system such as a lens 21 that images the emitter light source into the detector when the light strikes a reflective stripe on the code strip. The light from the emitter is reflected or absorbed by the stripes on the code strip. The output from the photodetector is again converted to a logic signal. In embodiments in which the photodetector includes a plurality of photodiodes that provide a signal that depends on matching an image of the strips to the photodiodes, a second lens 27 can be included to adjust the size of the code strip image to the size of the photodetectors in a manner analogous to that described above.

FIG. 3 illustrates another form of imaging encoder. An imaging encoder operates essentially the same as the reflective encoder described above, except that module 15 includes imaging optic 23 that forms an image of the illuminated code strip on the detector 14. In addition, the light source is processed by lens 22 such that the code strip is uniformly illuminated in the region imaged onto the detector.

To simplify the following discussion, the present invention will be explained in the context of a reflective encoder having a linear code strip; however, embodiments of the present invention that utilize circular code disks for monitoring the position of a shaft or the like can also be constructed. To simplify the discussion, the term code strip shall be defined to include circular code disks unless the context indicates otherwise.

Figure 4:
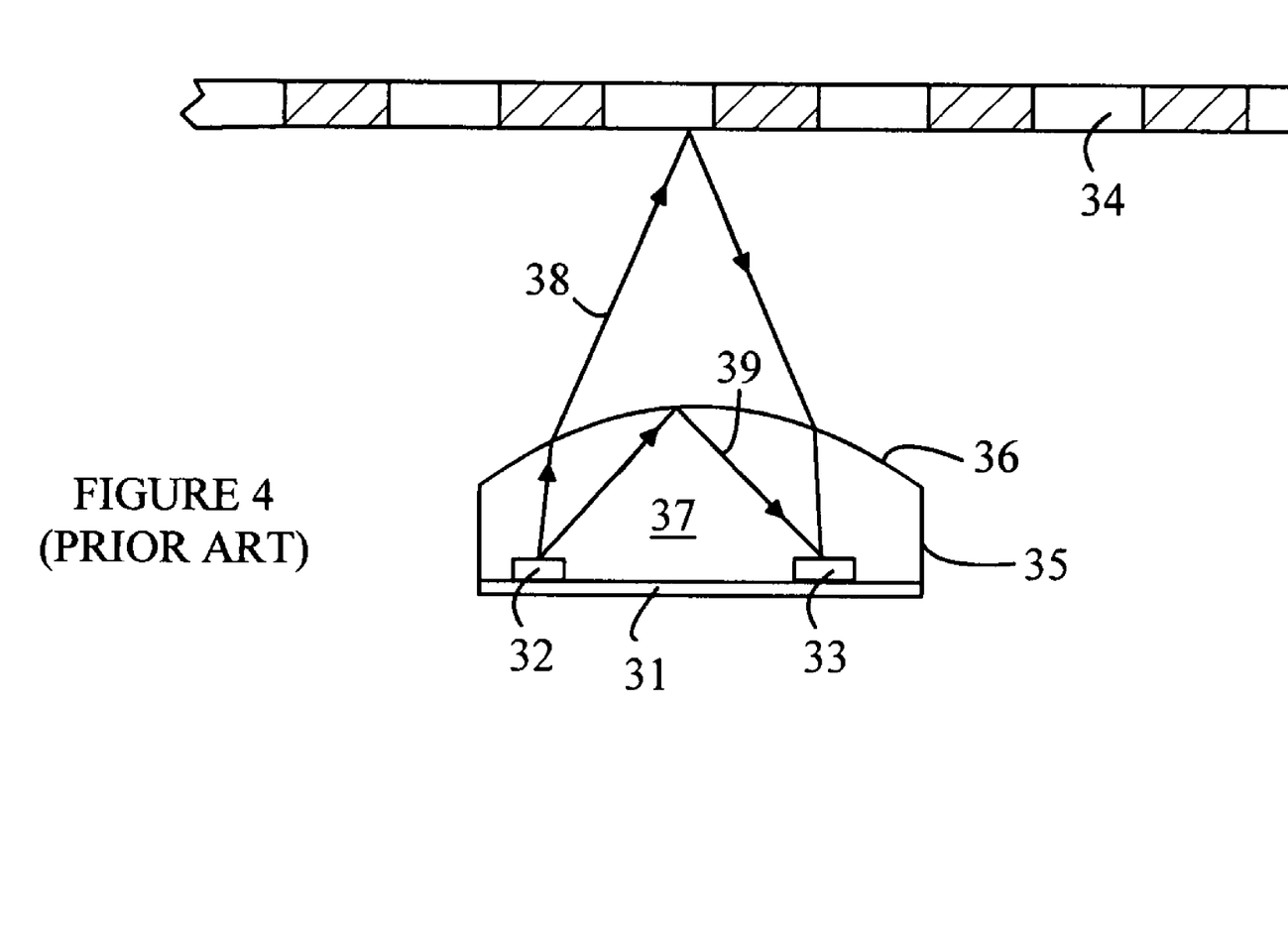
FIG. 4 illustrates a typical reflective encoder layout.

Refer now to FIG. 4, which illustrates a typical reflective encoder layout. The code strip 34 is illuminated with light from emitter-detector module 37 that includes an LED 32 and a photodetector 33 that are mounted on a substrate 31. Photodetector 33 includes one or more photodiodes. The number of photodiodes depends on the particular encoder design. These components are encapsulated in a clear epoxy layer 35 having a top surface that is molded to provide a lens that images the light from LED 32 that is reflected from code wheel 34 onto photodetector 33. A ray of the imaged light source is shown at 38.

The clear epoxy encapsulant has an index of refraction that is greater than that of the surrounding air. As a result, light striking surface 36 at angles greater than the critical angle is reflected back into the emitter-detector module as shown at 39. Some of this light strikes photodetector 33 directly. Some of the reflected light bounces off of the walls of the emitter-detector module and also reaches photodetector 33. The amount of light reaching photodetector 33 in this manner is independent of the light reflected from code strip 34, and hence, forms a constant background illumination that reduces the signal-to-noise ratio of photodetector 33.

The lenses that are molded into the epoxy encapsulant have parameters that are specific to the specific encoder design. These lens implement the functions of lenses 21 and 27 discussed above with reference to FIG. 2. For Example, if the distance between emitter detector module 37 and code strip 34 is changed, a different set of lenses is needed, and hence, a different emitter detector module must be used. Similarly, if the resolution of the code strip is changed, the magnification of the code strip image on the photodetectors must also be changed, and hence, a new set of lenses is again required.

Finally, it should be noted that the signal-to-noise ratio is also dependent on the difference in reflectivity between the reflective and absorptive bands on the code strip. The reflective bands are ideally planar mirrors in prior art encoders, and the absorptive bands are ideally perfectly black. In practice, however, the absorptive bands reflect some of the light incident thereon and some of this reflected light is imaged onto the photodetector by lens 27. Similarly, imperfections in the reflective bands lead to a loss of light. These imperfections further reduce the signal-to-noise ratio.

Figure 5:
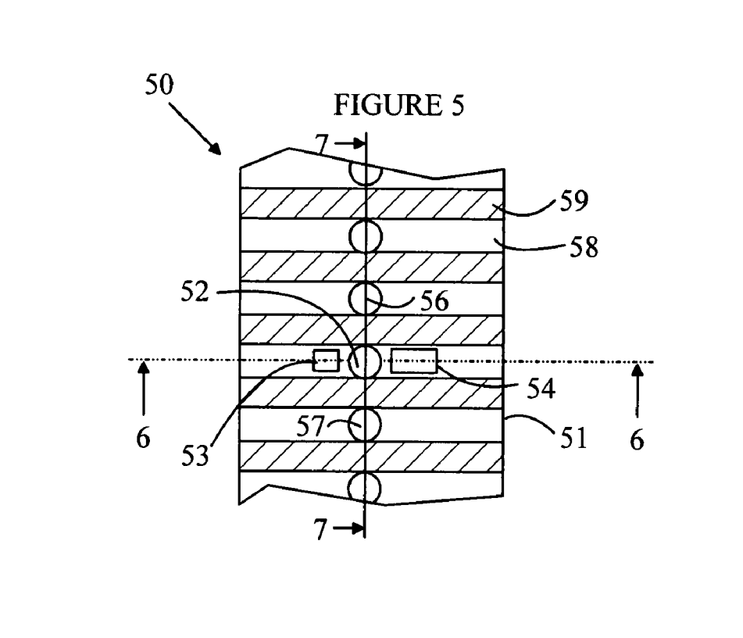
FIG. 5 is a top view of encoder 50.
Figure 6:
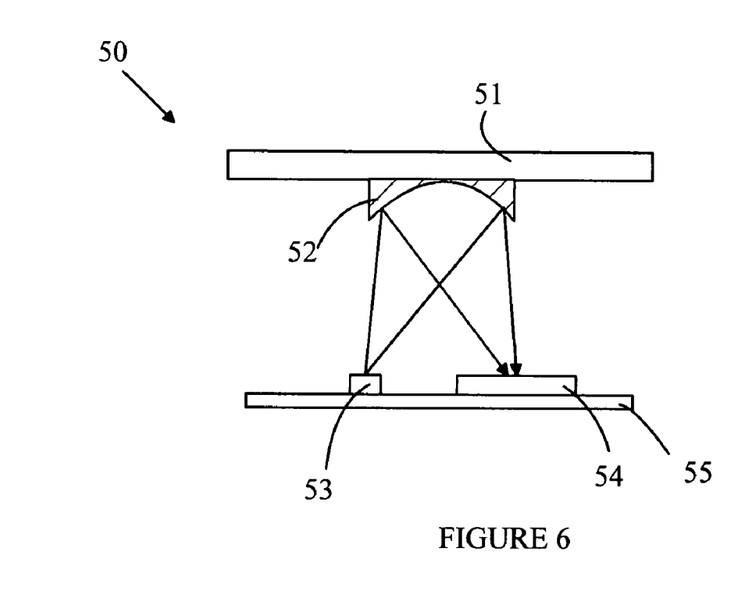
FIG. 6 is a cross-sectional view of encoder 50 through line 6-6 shown in FIG. 5.
Figure 7:
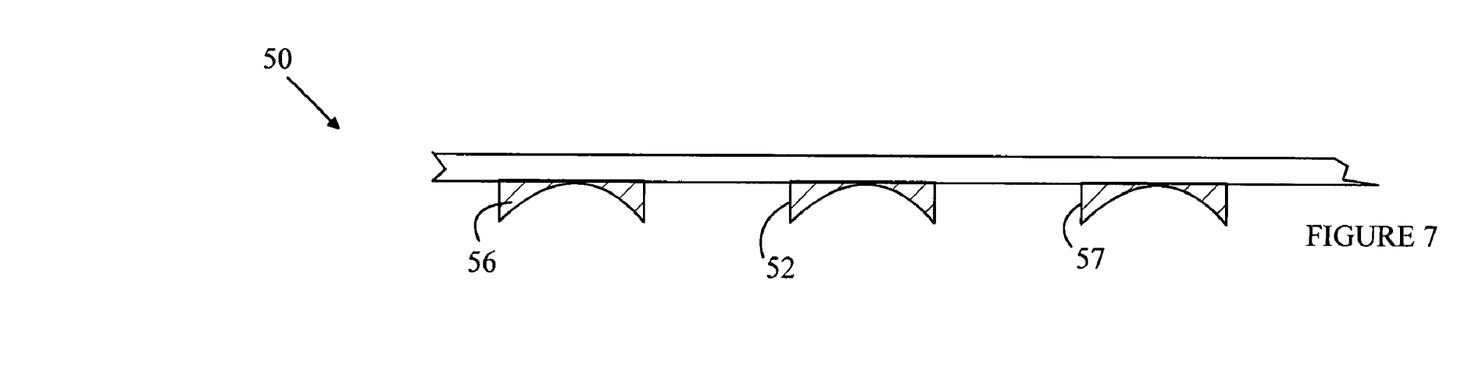
FIG. 7 is a partial cross-sectional view of a code strip through line 7-7 shown in FIG. 5.

The present invention reduces these problems by moving at least a portion of the optical system from the emitter detector module to the code strip. Refer now to FIGS. 5-7, which illustrate an encoder according to one embodiment of the present invention. FIG. 5 is a top view of encoder 50, and FIG. 6 is a cross-sectional view of encoder 50 through line 6-6 shown in FIG. 5. FIG. 7 is a partial cross-sectional view of code strip 51 through line 7-7 shown in FIG. 5. Encoder 50 is a linear encoder having a code strip 51. Code strip 51 has alternating reflective and absorbing bands shown at 58 and 59, respectively. The reflective regions include a reflective imaging element that images the light from light source 53 onto detector 54 that is part of an emitter detector module 55 that is mounted on one side of code strip 54. Exemplary reflective imaging elements are shown at 52, 56, and 57. In the embodiment shown in FIGS. 5-7, the reflective imaging elements provide all of the light processing functions necessary to image the light source onto the photodetector at the proper magnification. For example, the reflective imaging elements could be parabolic reflectors.

Since emitter detector module 55 does not need to provide any light processing functions, a standardized emitter detector module can be used. Consider the case in which a new encoder is to be designed requiring different light processing functions due to a change in the resolution or a change in the spacing between the code strip and the emitter detector module. The new light processing functions would be incorporated in the reflective imaging elements on that code strip, and hence, the same emitter detector module could be utilized with that new encoder.

It should also be noted that the emitter detector module does not require an encapsulating layer with a lens dome. Hence, the background light problems associated with internal reflections from the lens surface are also eliminated.

Finally, it should be noted that the use of the reflective imaging elements only in the reflective regions of the code strip substantially improves the signal-to-noise ratio of encoder 50. Assume that some light is reflected from the absorptive regions. This light will not be imaged into detector 54, and hence, it will be spread over a wide area. Hence, at worst, only a small fraction of this background light will reach detector 54.

Figure 8:
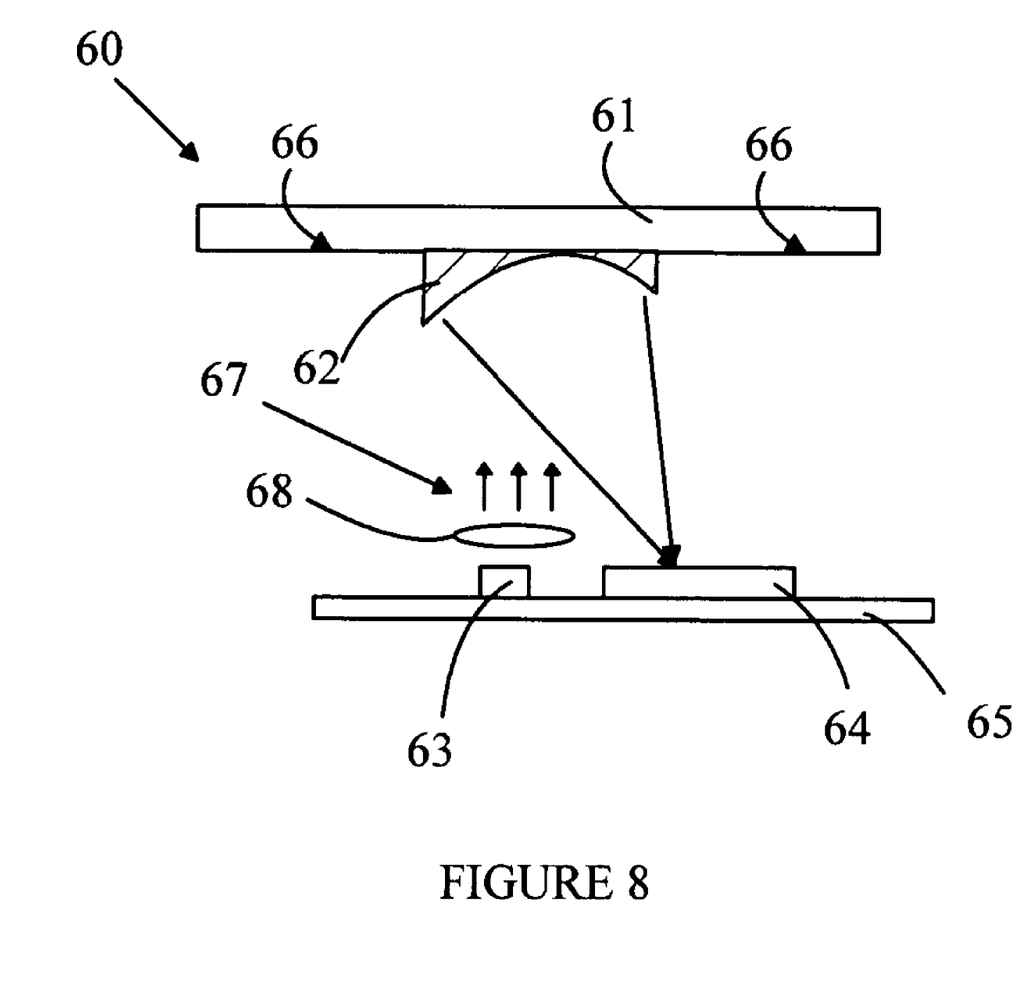
FIG. 8 is a cross-sectional view of a portion of an encoder 60.

Encoder 50 utilized a design in which all of the imaging optics were included in the reflective elements on the code strip. However, embodiments in which some of the imaging functions remain in the emitter detector module can also be utilized without losing the benefits of a standardized emitter detector module. Refer now to FIG. 8, which is a cross-sectional view of a portion of an encoder 60. Encoder 60 includes a carrier 61 having reflective and absorptive regions 62 and 66, respectively. Carrier 61 could be a code strip in a linear encoder as discussed above or a code wheel in a shaft encoder. Encoder 60 also includes an emitter detector module 65 having a light source 63 and a detector 64. The light source in emitter detector module 65 also includes a collimating lens 68 that provides a collimated light beam 67 that illuminates reflective imaging element 62 when that element is in a predetermined position with respect to emitter detector module 65. Reflective imaging element 62 is shaped such that it will image the collimated light onto detector 63 in emitter detector module 65 when carrier 61 is properly positioned with respect to emitter detector module 65.

As noted above, reflective encoders require precise control of the distance between the carrier and the emitter detector module. By providing a collimated light source, encoder 60 reduces the required precision, since the imaging of the light onto detector 64 depends only on the distance between the carrier and detector rather than the sum of the distance between the light source and the carrier and the distance between the carrier and the detector. Since the light source is collimated, the light source can be used in encoders having different gaps between the carrier and emitter detector module, and hence, the advantages of a standardized emitter detector module are still retained even though part of the optical processing remains in the emitter detector module.

It should also be noted that embodiments of the present invention in which the detector includes a lens or other imaging optics can also be constructed. In such embodiments the imaging function would be split between the reflective imaging element on the carrier and the lenses in the emitter detector module. This type of encoder could be useful in cases in which a satisfactory emitter detector module is available but that the emitter detector module has optics that are designed for a different emitter detector module to carrier distance or reflective region size. The reflective optical element would then be designed to "correct" the optics in the emitter detector module so that the emitter detector module will function properly in the new encoder. This arrangement can also be utilized to provide the increased background rejection discussed above while using an existing emitter detector module.

In many encoder designs, the detectors are organized into one or more pairs of detectors. Within each pair of detectors, the detectors are positioned such that one detector generates a signal that is the compliment of that generated by the other signal. Hence, when the detector is positioned over a reflective region, the first detector generates a high signal and the second detector is positioned over an absorptive region and generates a low signal. When the code strip is moved such that the reflective region is over the second detector, the absorptive region is positioned over the first detector and the reflective region is positioned over the second detector. If the signals from the two detectors are subtracted from one another, a signal that changes sign and lacks any DC bias from the background light is obtained. Such a signal is better suited to detecting the transitions between the absorptive and reflective regions than a signal that is obtained from only a single detector.

In the above-described embodiments, the code pattern carriers have alternating reflective and absorptive regions. In the reflective regions, the reflective optical element imaged the light from the light source onto a detector; while in the absorptive region, the light from the light source was lost through absorption on the surface of the carrier. In principle, a second detector and light source could be positioned such that the second detector provides a signal analogous to the complement detector discussed above.

Figure 9A:
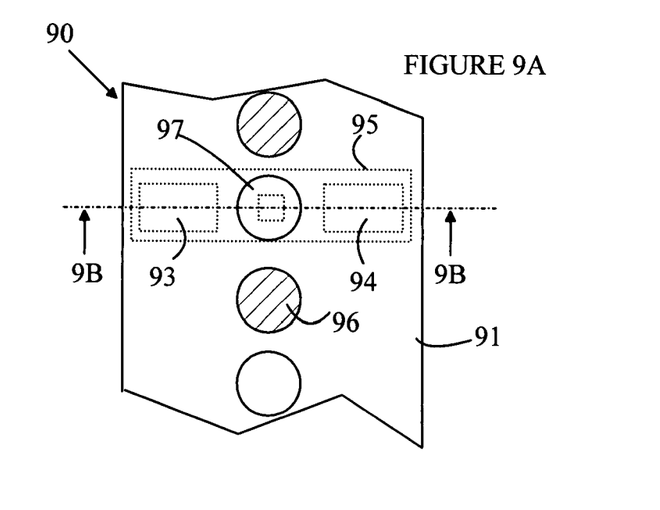
FIGS. 9A-9D illustrate another embodiment of an encoder according to the present invention.
Figure 9B:
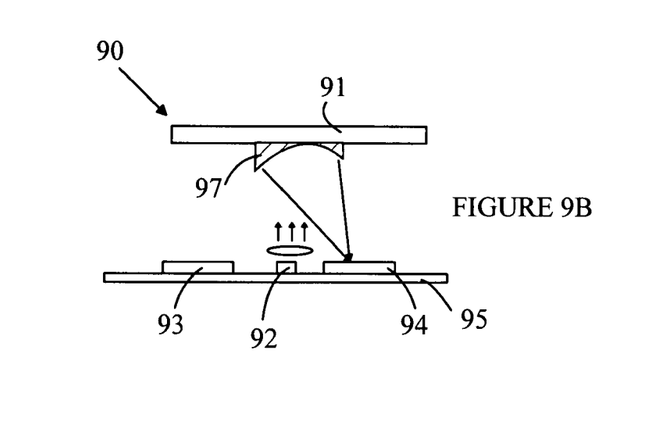
Figure 9C:
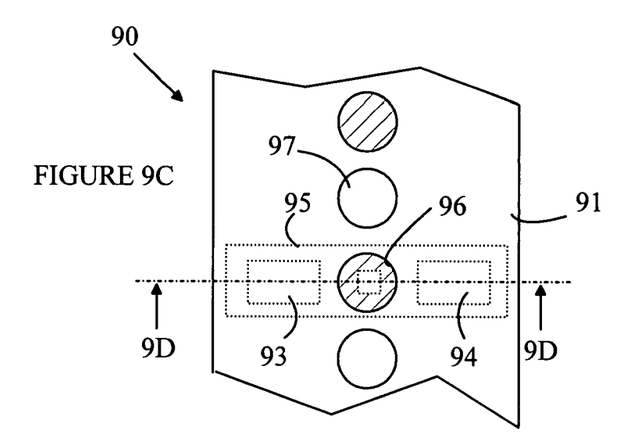
Figure 9D:
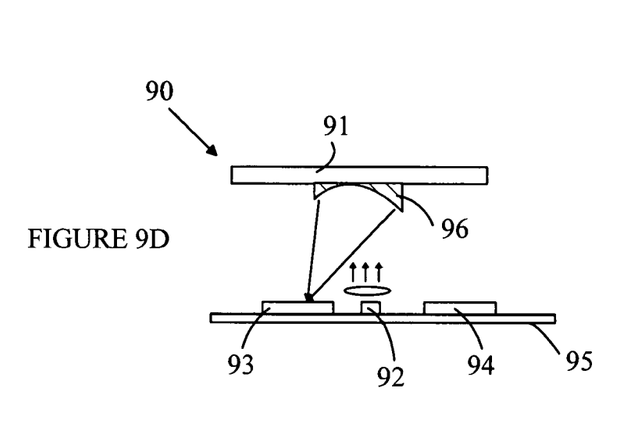

Refer now to FIGS. 9A-9D, which illustrate another embodiment of an encoder according to the present invention. FIGS. 9A and 9C are top views of a portion of a code strip 91 when the code strip is positioned over emitter detector module 95 at two different relative positions. FIGS. 9B and 9D are cross-sectional views through lines 9B and 9D, respectively. Encoder 90 differs from the previously described encoders in that the carrier has alternating reflective optical elements having different focal points rather than one optical element followed by one absorptive region, and so on. Emitter detector module 95 includes two detectors shown at 93 and 94. When code strip 91 is positioned over the first type of reflective element 97 as shown in FIG. 9A, the light from light source 92 is imaged onto detector 94. When code strip 91 moves relative to emitter detector module 95 such that it is positioned over a reflective optical element of the second type, i.e., reflecting optical element 96 as shown in FIG. 9C, the light from light source 92 is imaged onto detector 93. If a difference signal is generated by subtracting the outputs of detectors 93 and 94, a signal analogous to that described above can be obtained.

Figure 10:
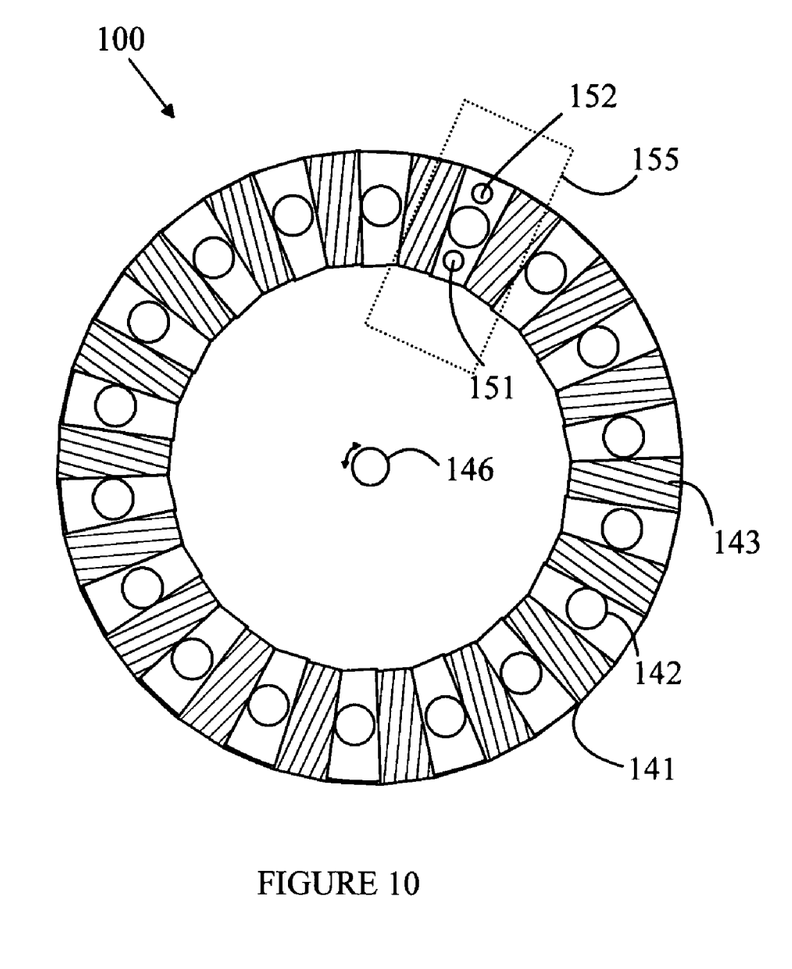
FIG. 10 is a top view of a shaft encoder 100 according to another embodiment of the present invention.

The above-described embodiments have been directed to linear encoders having a code strip for a carrier. However, embodiments of the present invention directed to shaft encoders can also be constructed. Refer now to FIG. 10, which is a top view of a shaft encoder 100 according to another embodiment of the present invention. Encoder 100 operates in a manner analogous to encoder 50 discussed above. Encoder 100 utilizes an encoding pattern carrier in the form of a code disk 141 that rotates when shaft 146 rotates. Code disk 141 has alternating reflective and absorptive regions. The reflective regions include a reflective imaging element 142 that images light from a light source 151 into a detector 152 that is part of an emitter detector module 155. The absorptive regions shown at 143 absorb the light from light source 151 and lack such a reflective imaging element.

The embodiments discussed above utilize reflective imaging elements that image the light source onto the detector in a manner in which the image would be a point if the light source was also a point and the detector was located at the proper distance from the carrier. However, embodiments in which the reflective imaging elements have other shapes can also be utilized. In particular, a cylindrical imaging element would generate an image that is a line from a point light source. This type of image could be particularly useful in multi-channel encoders or encoders in which the detector was a photodiode having a long narrow sensitive region.

A carrier according to the present invention can be constructed via a number of different methods. Since methods for forming three-dimensional protrusions or recessed areas are well known in the art, these methods will not be discussed in detail here. For the purposes of the present discussion it is sufficient to note that features of the size and optical quality required in the present invention are routinely constructed in the form of Fresnel Lenses.

For example, the carrier could be cast from a plastic material that is then covered with an aluminum layer to provide the reflective coating over the three-dimensional imaging elements. The non-reflective areas can be protected with a layer of photoresist to prevent the aluminum from being deposited on the areas that are to become opaque.

Alternatively, the aluminum in the opaque areas can be removed by laser oblation. In a second example, a carrier according to the present invention could also be constructed by stamping a preformed sheet that is either already reflective, i.e., a metallic sheet, or which is then rendered reflective by depositing a reflective material on selected portions of the sheet. The areas that are to become opaque could then be covered with an opaque material using conventional lithographic techniques. It should be noted that the opaque areas could also be created by punching or etching a hole through the carrier at the locations in question.

Various modifications to the present invention will become apparent to those skilled in the art from the foregoing description and accompanying drawings. Accordingly, the present invention is to be limited solely by the scope of the following claims.

What is claimed is:

1. An encoder comprising:
   a code pattern comprising multiple first regions and multiple second regions on a carrier comprising a planar surface, said first regions being reflective regions, said first and second regions being relatively positioned in an alternating pattern; and
   an emitter-detector module comprising a light source that generates light and directs a portion of said generated light at a first side of said carrier and a first detector that detects said light reflected from one of said first regions,
   wherein each of said first regions comprises a three-dimensional element for directing said light from said light source onto said first detector, said element having a surface that is inclined at an oblique angle with respect to said planar surface and wherein said code pattern moves with respect to said emitter-detector module,
   wherein said second regions are configured such that said light from said light source incident on said second regions is not directed to said first detector, and
   wherein said emitter-detector module comprises a second detector that is displaced from said first detector and wherein each of said second regions comprises a second three-dimensional element, which is distinct and separate from said first three-dimensional element, that reflects said light from said light source into said second detector such that said light from said light source incident on said first three-dimensional element of said first regions is exclusively directed to said first detector and said light from said lights source incident on said second three-dimensional element of said second regions is exclusively directed to said second detector.

2. The encoder of claim 1 wherein said three-dimensional element comprises a reflective imaging element that images said light source onto a surface of said first detector.

3. The encoder of claim 2 wherein said reflective imaging element comprises a parabolic reflector.

4. The encoder of claim 1 wherein said second regions comprise a planar surface that absorbs light.

5. The encoder of claim 1 wherein said second regions comprise a transparent surface that transmits light that passes through said carrier.

* * * * *

UNITED STATES PATENT AND TRADEMARK OFFICE
CERTIFICATE OF CORRECTION

PATENT NO. : 7,358,481 B2 Page 1 of 1
APPLICATION NO. : 11/369287
DATED : April 15, 2008
INVENTOR(S) : Theng Hooi Yeoh et al.

It is certified that error appears in the above-identified patent and that said Letters Patent is hereby corrected as shown below:

Column 8, Line 21, Claim 1, delete "lights" and insert -- light --.

Signed and Sealed this

Sixteenth Day of November, 2010

David J. Kappos
*Director of the United States Patent and Trademark Office*